*3,534,552*
FLUID PRESSURE AMPLIFYING APPARATUS FOR FLUID PRESSURE SYSTEMS
Robert E. Mitton, San Diego, Calif., assignor to
E. Forrest Jones, San Diego, Calif.
Filed Mar. 26, 1969, Ser. No. 810,502
Int. Cl. F15b 5/00, 7/00, 9/00
U.S. Cl. 60—54.5     8 Claims

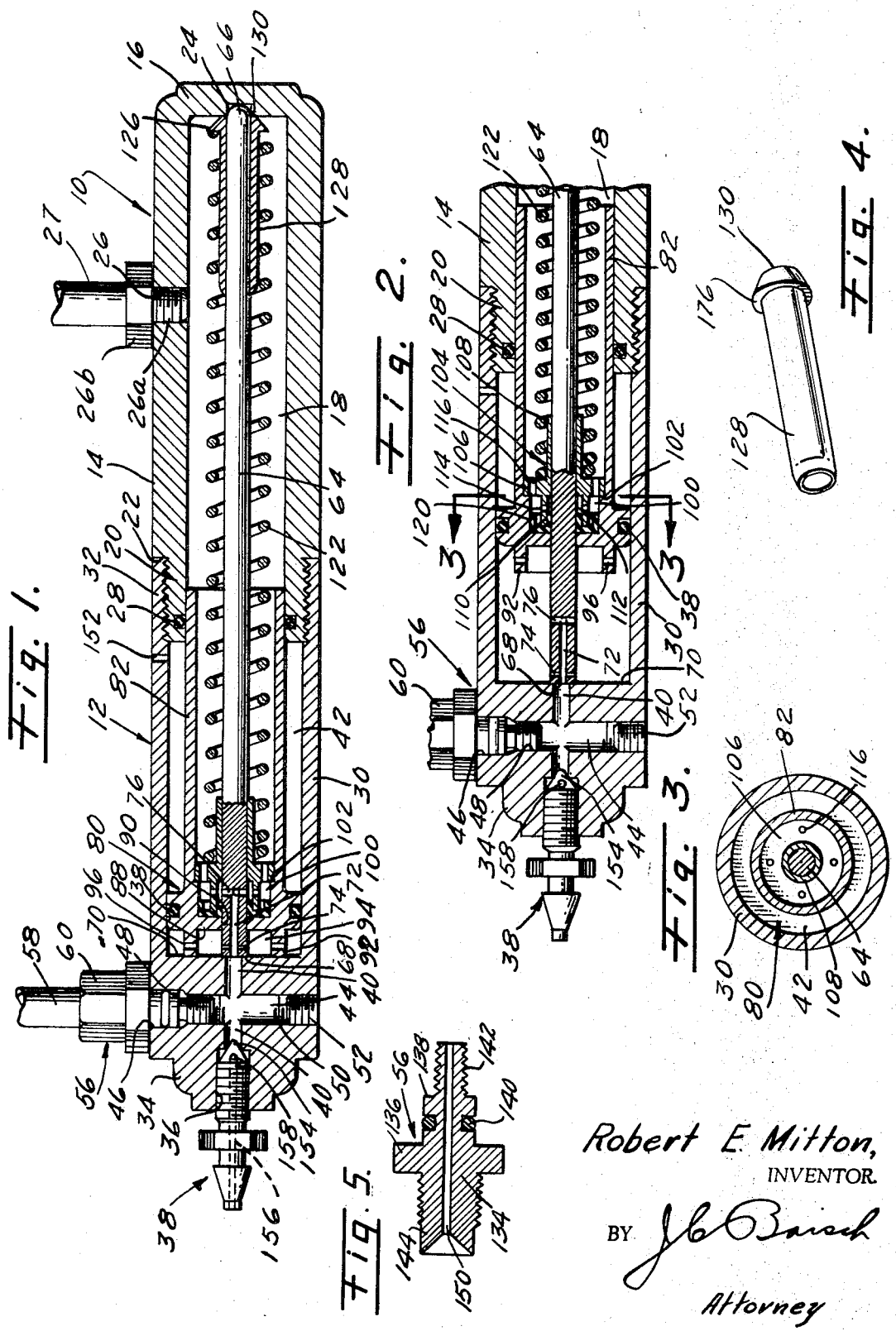

ABSTRACT OF THE DISCLOSURE

An apparatus for amplifying the fluid pressure in hydraulic brake systems for motor vehicles in which an incoming low level fluid pressure received by the apparatus is amplified at a preselected fluid pressure to a high level fluid pressure affording fluid braking pressure substantially greater than that derived from the normal increase in fluid pressure resulting from actuation of the brake pedal of the vehicle.

BACKGROUND OF THE INVENTION

Field of the invention

A hydraulic pressure amplifier or booster for hydraulic brake systems.

Description of the prior art

Hydraulic brake systems for motor vehicles and the like include a master cylinder with a piston therein, the master cylinder is in communication with a reservoir of brake fluid and with fluid in the hydraulic lines to the wheel cylinders of the braking system. Actuation of the brake pedal effects operative movement of the piston of the master cylinder places fluid in the master cylinder and the entire hydraulic system under pressure, including the wheel cylinders for actuations of brake shoes of each of the wheels.

Various devices have been proposed for amplifying or boosting fluid pressure in the brake system. Such devices are incorporated in the hydraulic system and permits a selected initial application of braking pressure in the wheel cylinders in a normal manner. Upon reaching a predetermined increased fluid pressure the device greatly amplifies or boosts the braking pressure transmitted to the wheel cylinders.

Generally these prior devices have certain inherent performance deficiencies or disadvantages such as a sensation of added resistance when the transition from the normal application of brake pressure to the amplified pressure. That is, the transition is rather abrupt and therefore annoying to the operator.

Further, such prior devices have a considerable number of moving parts and are complicated in construction and operation.

SUMMARY OF THE INVENTION

The present invention comprises a two part tubular body, the parts being connected together in end to end relation. The device is easily and quickly connected into the hydraulic system by means of a turnbuckle adapter.

The body defines axially aligned chamber parts, one part being of greater diameter than the other. Within the chambers is a tubular piston having a portion slidable in the smaller diameter part of the chamber and a head in the larger diameter part.

A rigid valve stem extends throughout the length of the chamber and is received in the smaller diameter part of the piston and sealingly extends through a bore provided therefor in the head of the piston, said piston sliding on said stem. A long spring is disposed on the stem and extends from the outer end of the smaller chamber part and the smaller diameter part of the piston to the piston head to exert effective reactive pressure between said end of the smaller diameter chamber part and the piston head. When the brake pedal is activated the brake cylinders are highly precharged and thereafter the amplified pressure is supplied to said brake cylinders and because of the long spring the transition is very smooth.

A venturi orifice is in the fluid connection between the larger diameter part of the body chamber and the master cylinder to aid in clearing fluid at the side of the head of the piston on which pressure is applied by the master cylinder for amplifying the pressure to the wheel or brake cylinders. This orifice also prevents sudden surges of pressure to the wheel or brake cylinders.

OBJECTS AND ADVANTAGES OF THE PRESENT INVENTION

It is an object of the present invention to provide an amplifying device that effects a smooth transition from low to amplified or multiplied pressure for operating the wheel or brake cylinders so that the operator is not aware of said transition from the normal pressure developed by the master cylinder and the amplified pressure effected by the amplifying device.

Another object of the invention is to provide a device of this character that a minimum of parts, there being but one moving part.

Still another object of the invention is to provide a device of this character that is extremely simple and rugged in construction and operation.

A further object of the invention is to provide a device of this character that is reliable in operation.

A still further object of the invention is to provide a device of this character that may be easily and quickly installed in hydraulic brake system.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that the properly within the scope of the appended claims.

Referring to the drawings, which are for illustrative purposes only:

FIG. 1 is a longitudinal sectional view of apparatus embodying the present invention, the parts thereof being in their normal position;

FIG. 2 is a similar view of the piston end of the mechanism showing the parts in a pressure amplifying position;

FIG. 3 is a sectional view taken on line 3—3 of FIG. 2;

FIG. 4 is a perspective view of the spinner or spring retainer; and

FIG. 5 is a longitudinal sectional view of the adaptor for connecting the device to the master cylinder.

Referring more particularly to the drawings, there is shown a fluid pressure amplifying apparatus for fluid pressure systems embodying the present invention, said apparatus having a body comprising what is termed herein a foreward part, indicated generally at 10, and a rear part, indicated generally at 12.

Forward part 10 is tubular, having a cylindrical wall 14 and a forward end wall 16, said cylindrical wall and end wall defining a small cylindrical chamber 18. Opposite the end wall 16 the part 10 is open and has a reduced diameter portion 20 which is externally threaded and provided with an annual shoulder 22 at the base of said reduced diameter portion. End wall 16 has an internal, axial recess 24 therein, and the cylindrical wall of said part 10 has a lateral tapped opening 26 for reception of the externally threaded end 26a of a fitting 26b for a fluid conduit 27 connected to the wheel or brake cylinders, not shown. Adjacent the open end of the part 10 there is an internal annual groove for reception of a seal 28 which is shown as an O-ring although any other suitable seal may be used. The O-ring is of neoprene or any other suitable material that is unaffected by the fluid in the system of which the present device is a part.

Rear part 12 of the apparatus is also tubular having a cylindrical wall 30. There is a forward end portion 32 that is internally threaded and screwed onto the externally threaded reduced diameter portion 20, the forward end of the part 12 abutting against the shoulder 22 when the part 10 and 12 are screwed together.

At its rear end part 12 has a relatively thick end wall 34 which has an axial tapped bore 36 for a bleed valve, indicated generally at 38. A reduced diameter axial bore 40 extends forwardly from the reduced diameter tapped bore 38, said reduced diameter bore communicating with an axial cylindrical chamber 42 defined by the cylindrical wall 30 and the end wall 34 of the part 12. Chamber 42 is of greater diameter than the chamber 18 and is axially aligned therewith. End wall 34 also has a cross bore 44 with a counter bore 46 of greater diameter than the cross bore 44. Cross bore 44 is tapped at the end joining the counter bore as indicated at 48, and the opposite end of said cross bore 44 is also tapped as at 50 and provided with a threaded plug 52 for closing said opposite end. The cross bore 44 and the axial bore 40 intersect so that there is fluid communication therebetween.

The apparatus is connected to the master cylinder, not shown, of the brake system by means of a turnbuckle adaptor, indicated generally at 56, and described more particularly hereinafter, a conduit 58 connected to the master cylinder having a fitting 60 attached to the outer end of said adaptor.

Extending between the end wall 16 of the forward part 10 and the end wall 34 of the rear part 12 is a rigid valve steam 64. At its forward end the valve stem 64 is rounded as to 66 and said rounded end is disposed in the recess 24 of end wall 16. The opposite end 68 of the valve stem is flat and normal to the axis of the valve stem, said flat end abuts tightly against the inner side 70 of the end wall 34 when the parts 10 and 12 are screwed together as shown in FIGS. 1 and 2.

The rear end of stem 64 has an axial bore 72 extending forwardly from the flat end 68, said axial bore 72 communicating with the inner end of the bore 40 in end wall 34. Adjacent the flat end 68 said stem has a cross bore 74 and spaced forwardly of the cross bore 74 is another cross bore indicated at 76, both cross bores 74 and 76 intersecting the longitudinal or axial bore 72.

Within the chambers 18 and 42 is a piston, indicated generally at 80, said piston being operably slidable on the valve stem 64 and in the chambers defined by the forward and rear parts 10 and 12 of the body.

Piston 80 comprises a cylindrical sleeve 82 slidable in the chamber 18 and in sealing engagement with the O-ring 38. At the rear end of said piston there is a head 84 the diameter of which is substantially the same as the inside diameter of the chamber 42 so as to be slidable in said chamber. Head 84 comprises a radial flange on the piston and has an annular external groove in which is disposed an O-ring 86 which provides a sliding seal with the wall of chamber 42 and prevents fluid bypassing said head.

Piston 80 also has end wall 88 having a bore 90 therethrough in which stem 64 is slidably received, and said piston has a cylindrical flange 92 extending axially rearwardly of said end wall 88. The external diameter of flange 92 is smaller than the diameter of chamber 42 while the inside diameter of said flange is substantially greater than the diameter of said stem 64, said flange defining a chamber 94 with which cross bore 74 communicates. Flange 92 has a plurality of passages 96 therethrough connecting chamber 94 with that portion of the chamber 42 rearwardly of head 84 and outwardly of flange 92 when the piston is at its normally rearward position.

The cylindrical wall of the piston 80 is thicker forwardly of the wall 88, as at 98 defining a chamber 100 at the forward end of which there is an outwardly extending shoulder 102.

Slidable on the stem 64 is cup valve retainer, indicated generally at 104, having a head 106 from which a reduced diameter sleeve 108 extends forwardly and which is slidably disposed on stem 64. At the rear side of head 106 is a rearwardly extending cylindrical flange 110 having a smaller outside diameter than the chamber 100 and greater inside diameter than the outside diameter of the stem and defining an annular chamber 112 which is connected with chamber 100 by means of ports 114. Piston head or flange 106 has a plurality of longitudinally extending passages 116 therethrough connecting chamber 100 with the interior of the piston sleeve 82, said passages 116 being larger than the ports 114 and cross bores 76 in the stem.

Within the chamber 100 and disposed on the front side of the end wall 88 of the piston is a valve 120 that is U-shaped in cross section. The valve is of any suitable resilient material resistant to the fluid in the system, such as, for example, neoprene. Cylindrical flange 110 of the cup valve retainer is disposed within the seal 120 and is held against said seal by a spring 122 which reacts against the head 106 of said cup valve retainer and a flange 126 of a tubular spinner cap 128 disposed on the stem 64 in the front end of chamber 18. Flange 126 tapers forwardly and the front end of said flange comprises a thin edge 130 which engages the end wall 16 of the part 10. Spinner cap 128 is slidable and rotatable on the stem to facilitate assembly of the apparatus. Spring 122 is normally under compression when the apparatus is assembled so as to exert pressure on the piston through the valve 120.

Installation of the apparatus is facilitated by the turnbuckle adaptor 56, best shown in FIG. 5. The adaptor has a body 134 with an integral nut part 136. At one side of said nut part 136 there is a cylindrical portion 138 having an external annular groove therein for reception of a seal 140 which may be of any suitable character but is shown as an O-ring of suitable material such as the other O-rings and the valve 120. At the free end of the portion 138 is a reduced diameter externally threaded part 142. The thread of part 142 is of one hand, such as left hand.

From the opposite side of the nut part 136 an externally threaded part 144 extends axially and is adapted to be received within the fitting 60, these threads being of opposite hand, that is of right hand, said adaptor having a fluid flow passage 150 therethrough.

When attaching the apparatus, the part 142 is screwed into the part 48 of the cross bore 44 while the part 144 screws into the fixture 60. This occurs as the adaptor is rotated in one direction by means of a tool such as a wrench.

OPERATION OF THE APPARATUS

With the parts of the apparatus in the normal position, as shown in FIG. 1, actuation of the brake pedal to effect application of the brakes, fluid is forced from the master cylinder through the conduit 58, adaptor 56, bore 44, bore 40 and into the axial bore 72 in the stem 64. The fluid also flows outwardly through the cross bores 74 and 76. Fluid from the cross bores 74 flows into the chamber 94, through passages 96 and into the adjacent part of the chamber 42. Fluid from the cross bores 76 flows into the chamber 112, through orifices 114, into chamber 100, through passages 116 and into the interior of the piston, thence into the chamber 18 and to the wheel or brake cylinders by way of the fixture and conduit 27.

Because of the spring 122 the piston 90 is held against movement until a substantial pressure is built up ahead of said piston and the brake or wheel cylinders are precharged thereby urging the brake shoes against the brake drums. This precharging is of any desired pressure and this pressure depends on the strength of the spring. A precharging pressure may be 300 or 400 p.s.i., for example.

When a predetermined pressure is reached the fluid pressure to the rear of the piston head 84 causes small forward movement of the piston resulting in the valve 120 closing the cross bores 76. Thereafter full pressure developed by the master cylinder is applied behind the piston head 84 to further build up and greatly amplify the pressure ahead of the piston 80 and the wheel or brake cylinders. After the piston has traveled forwardly a sufficient distance to clear the cross bores 76 fluid under pressure from the master cylinder also flows into portion of chamber 42 behind the piston head 84.

It is to be noted that the portion of chamber 42 ahead of the piston head 84 and the rear end of the forward part 10 is vented to atmosphere by an atmospheric vent 152 so there will be no undesirable air pressure in this part of chamber 42.

The time the piston begins to move and amplify the pressure to the wheel cylinders depends on the strength of the spring 122 and the fluid pressure areas, the latter being the area behind the head 80 and the area within the sleeve 82 of the piston. A ratio of amplification that has been found to be very good is two to one (2–1).

The spring 122 is relatively long which is an important factor in the smooth operation of the apparatus. There is no sensation of added resistance as the shift to amplification occurs.

Should there be a sudden excess of pressure on the piston the venturi orifices or cross bores 76 prevent premature movement of the piston.

When the operator eases or releases the pressure on the brake pedal the spring 122 forces the piston rearwardly until the free end of flange 92 engages the end wall 34. Fluid behind the piston is forced back into the master cylinder through the same route it entered the apparatus, the direction of flow being of course reversed. As the piston moves rearwardly the valve 120 moves across first the cross bores 76 and then the cross bores 74 so that both bores 74 and 76 are uncovered and the apparatus is ready for brake applying operation again.

Means for bleeding the fluid system is provided by means of the bleed valve 38 which is screwed into the tapped bore 36. The inner end of the valve has a tip 154 that is tapered and adapted to be seated on the annular edge at the junction of the bore 36 and bore 40. There is a bleed passage 156 through the bleed valve which terminates in a port 158 located outwardly of the seating part of the valve and when the valve is in the closed position, as shown in FIGS. 1 and 2, no fluid, air or liquid, can escape through the bleed valve. To bleed the system the bleed valve is turned to unscrew same and move the tip 154 outwardly of the passage 40. Air in the system may then escape through the port 158 and passage 156.

I claim:

1. Fluid pressure amplifying apparatus for fluid pressure systems, comprising:
    (A) a body having front and rear end walls, the interior of said body being hollow and including a small diameter cylindrical chamber at the front end and a larger diameter cylindrical chamber at the rear end, said chambers being axially aligned, the smaller chamber having an opening for connection with mechanism to be actuated by fluid pressure, the rear wall having a fluid passage therein opening axially into the larger diameter chamber and adapted to be connected with a source of fluid adapted to be placed under pressure;
    (B) a valve stem extending axially in said chambers and having its rear end abutting against the inner side of the rear wall, said stem having an axial passage extending forwardly from its rear end and in communication with the fluid passage in the rear wall;
    (C) a piston slidable on said stem and having
        (a) a sleeve portion slidable within the small diameter cylindrical chamber, said sleeve portion being open at its forward end and in communication with the small diameter chamber, the rear end of said sleeve being closed,
        (b) a head adjacent the rear end of said piston and slidable within the larger diameter chamber,
        (c) means for defining space for fluid behind said piston,
        (d) passageway means for connecting the axial passage of the stem with said space and with the interior of the sleeve of the piston;
    (D) a valve carried by the piston and slidable on the valve stem, said valve permitting fluid flow into the sleeve of the piston when the latter is in its normal retracted inoperative position but cutting off fluid flow into the sleeve when said piston initially moves forwardly;
    (E) and a spring urging said piston to its normal retracted position.

2. The invention defined by claim 1, wherein the rear end of the sleeve is closed by a wall having an opening therein slidably receiving said stem, the passageway means connecting the axial passage of the stem with the interior of the sleeve comprises at least one cross bore, and said valve is disposed against said wall of the sleeve and slidable on said stem, said cross bore being open when the piston is at its inoperative retracted position but is closed by said valve upon initial operative movement of the piston.

3. The invention defined by claim 2, wherein the valve is U-shaped in cross section and is urged against said wall by pressure of said spring acting through a valve container.

4. The invention defined by claim 3, wherein the valve is of resilient material.

5. The invention defined by claim 1, wherein the body of the apparatus comprises a forward part defining the small diameter chamber and a rear part defining the larger diameter chamber, said parts being threadably secured together, the forward end wall of the forward part having an internal axial recess therein in which the forward end of the valve stem is disposed.

6. The invention defined by claim 5, including a tubular spinner cap slidably disposed on said stem, said spinner cap having a radially extending flange at its forward end, said flange tapering forwardly to a relatively thin annular edge for engagement with the adjacent front wall of the front part of said body, a forward end portion of the spring being disposed on the spinner cap with the forward end of the spring engaging said flange.

7. The invention defined by claim 4, wherein the shape of the valve is such as to form an annular channel at one side, and said valve retainer has a head with a forwardly extending sleeve and a rearwardly extending cylindrical flange in the channel of the valve, the free end of said cylindrical flange engaging the bottom of the valve channel and urging same against the adjacent wall closing the rear end of said sleeve, said valve retainer having passages therein for the flow of fluid between the cross bore controlled by the valve and the interior of the sleeve, and said spring reacts against the head of said valve retainer.

8. The invention defined by claim 1, wherein the rear end wall of the body has a tapped opening communicating with the fluid passage in said end wall; and a turnbuckle adaptor having a nut part and externally threaded parts extending in opposite directions from said nut part, the threads of one of said externally threaded parts being of opposite hand from the threads of the other externally threaded part, one of said parts being adapted to be screwed into a tapped opening in said rear end wall, the other of said parts being adapted to be screwed into a tapered opening in a part to which the apparatus is connected, said one of said parts having an external annular groove, and an O-ring disposed in said groove.

References Cited

UNITED STATES PATENTS

| | | |
|---|---|---|
| 2,399,270 | 4/1946 | Vickers. |
| 2,940,261 | 6/1960 | Porters. |
| 3,036,436 | 5/1962 | Mitton. |

MARTIN P. SCHWADRON, Primary Examiner

R. R. BUNEVICH, Assistant Examiner

U.S. Cl. X.R.

60—54.6, 10.5